(12) United States Patent
Horak

(10) Patent No.: US 10,781,908 B2
(45) Date of Patent: Sep. 22, 2020

(54) DRIVELINE COMPONENTS WITH WELD VENT

(71) Applicant: GKN Automotive Limited, Worcestershire (GB)

(72) Inventor: Kevin P. Horak, Clarkston, MI (US)

(73) Assignee: GKN Automotive Limited, Worcestershire (GB)

(*) Notice: Subject to any disclaimer, the term of this patent is extended or adjusted under 35 U.S.C. 154(b) by 116 days.

(21) Appl. No.: 15/837,369

(22) Filed: Dec. 11, 2017

(65) Prior Publication Data
US 2019/0178362 A1    Jun. 13, 2019

(51) Int. Cl.
| F16H 57/00 | (2012.01) |
| F16H 48/40 | (2012.01) |
| B60K 17/346 | (2006.01) |
| F16H 48/38 | (2012.01) |

(52) U.S. Cl.
CPC ........ *F16H 57/0025* (2013.01); *B60K 17/346* (2013.01); *F16H 48/40* (2013.01); *F16H 2048/382* (2013.01); *F16H 2048/385* (2013.01)

(58) Field of Classification Search
CPC ............ B23K 2101/008; B23K 33/006; B23K 33/008; F16D 1/02; F16D 1/027; F16D 1/06; F16D 1/068; F16D 2250/0076; F16H 48/42; F16H 2048/382; F16H 2048/385; F16H 57/0025
USPC ................................ 228/165, 167–169, 220
See application file for complete search history.

(56) References Cited

U.S. PATENT DOCUMENTS

| 2,662,277 | A * | 12/1953 | Stone | B23K 1/18 228/168 |
| 6,378,761 | B2 * | 4/2002 | Eulenstein | B23K 20/16 228/246 |
| 8,876,649 | B2 * | 11/2014 | Uchida | F16H 48/38 475/220 |
| 9,120,184 | B2 * | 9/2015 | Uchida | B23K 31/125 |
| 9,157,516 | B2 * | 10/2015 | Cripsey | F16H 48/40 |
| 9,239,104 | B2 * | 1/2016 | Uchida | B23K 26/30 |
| 9,933,061 | B2 * | 4/2018 | Shirakawa | B23K 15/0006 |
| 10,125,855 | B2 * | 11/2018 | Yanase | F16H 48/40 |

(Continued)

FOREIGN PATENT DOCUMENTS

| DE | 102015218951 A1 * | 3/2017 | ............ B21K 1/30 |
| EP | 0178394 B1 | 1/1991 | |

(Continued)

*Primary Examiner* — Bobby Rushing, Jr.
(74) *Attorney, Agent, or Firm* — Jennifer M. Brumbaugh; Reising Ethington P.C.

(57) ABSTRACT

In at least some implementations, a torque transmitting apparatus includes a first member arranged for rotation about an axis and having a first surface oriented substantially perpendicular to the axis, and a second member having a second surface with at least a portion that is parallel to and engaged with at least a portion of the first surface. The second member is coupled to the first member by a weld provided in an interface region defined by an area of radial overlap between the first surface and the second surface. The groove is provided in one or both of the first surface and the second surface, the groove has a portion located radially inboard of the weld and at least one outlet that, at least without the weld, is communicated with a radially outer edge of the interface region.

20 Claims, 9 Drawing Sheets

(56) References Cited

U.S. PATENT DOCUMENTS

2013/0195545 A1\* 8/2013 Tsuchida ................ F16H 48/40
　　　　　　　　　　　　　　　　　　　　403/270
2014/0083191 A1\* 3/2014 Iwatani ................ G01N 29/043
　　　　　　　　　　　　　　　　　　　　73/588

FOREIGN PATENT DOCUMENTS

| EP | 1719572 A2 \* | 11/2006 | ......... B23K 15/0093 |
| GB | 2464088 B | 8/2012 | |
| JP | H0314066 U | 2/1991 | |
| JP | 2011167746 A | 9/2011 | |
| WO | WO0078561 A1 | 12/2000 | |
| WO | WO2016014156 A2 | 1/2016 | |

\* cited by examiner

DRIVELINE COMPONENTS WITH WELD VENT

TECHNICAL FIELD

The present disclosure relates generally to welded components within a vehicle driveline.

BACKGROUND

In general, vehicles include drivelines that transmit torque from an engine to one or more wheels. Automotive drivelines are commonly equipped with torque transmitting apparatuses in a front axle, front Power Transfer Unit (PTU) or a rear axle. The torque transmitting apparatus may include a gear set that is utilized to transmit torque from an input to an output. One or more gears within the gear set may be welded to a rotational member.

During the welding operation, gases that reside in isolated cavities between the joined components are heated and therefore expand. In the absence of a ventilation path, the gases may escape between the surfaces at which the components are joined and may interrupt with the weld, prior to or after completion of the weld. The pressure of the expanding gases may be great enough to form a flow path or opening through the molten weld, resulting in an incomplete weld.

SUMMARY

In at least some implementations, a torque transmitting apparatus includes a first member arranged for rotation about an axis and having a first surface oriented substantially perpendicular to the axis, and a second member having a second surface with at least a portion that is parallel to and engaged with at least a portion of the first surface. The second member is coupled to the first member by a weld provided in an interface region defined by an area of radial overlap between the first surface and the second surface. The groove is provided in one or both of the first surface and the second surface, the groove has a portion located radially inboard of the weld and at least one outlet that, at least without the weld, is communicated with a radially outer edge of the interface region.

In at least some implementations, at least one outlet is located either in the weld or radially outboard of the weld, and at least one outlet may be open to a radially outer edge of the interface region. In at least some implementations, the first surface includes a first portion that is axially inclined away from the second portion providing a gap between the second surface and the first portion of the first surface, the gap communicates with the radially outer edge of the interface region and the outlet communicates with the radially outer edge of the interface region via the gap.

The groove may be formed in the first surface, and the first member may include a radially outer surface at a radially outer edge of the first surface, with the outlet open to the radially outer surface at the radially outer edge of the first surface. In this way, the outlet may directly communicate in a radial direction with the space outboard of the interface region. Further, in at least some implementations, one groove may provide multiple outlets, for example, the groove may extend circumferentially relative to the axis and include two outlets with one outlet at each end of the groove. In some implementations, multiple grooves are provided and the grooves collectively include multiple outlets that are spaced apart circumferentially. This may permit gasses to be radially vented from different locations about the periphery of the interface region as the weld is formed circumferentially about the interface region.

In at least some implementations, the first member includes a radially extending flange on which the first surface is defined, and an axially extending pilot surface. The second member includes an inner surface that defines an opening through which the first member is received with the inner surface engaged with the pilot surface. The second member is coupled to the first member by a weld provided in an interface region defined by an area of radial overlap between the first surface and the second surface. A groove is provided in one or both of the first surface and the second surface, the groove has a portion located radially inboard of the weld and at least one outlet that, at least without the weld, is communicated with a space radially outboard of the interface region.

In at least some implementations, the weld may fill at least part of the groove and prevent communication from the portion located radially inboard of the weld to the outlet, and/or the at least one outlet is located either in the weld or radially outboard of the weld. The outlet(s) may communicate directly with the radial periphery of the interface region such as by an outlet being provided at the radial periphery of the first surface or the outlet may communicate with the radial periphery of the interface region via a gap between at least part of the radially overlapped surfaces of the first member and second member.

BRIEF DESCRIPTION OF THE DRAWINGS

The following detailed description of preferred embodiments and best mode will be set forth with reference to the accompanying drawings, in which.

DETAILED DESCRIPTION

Figure 1:
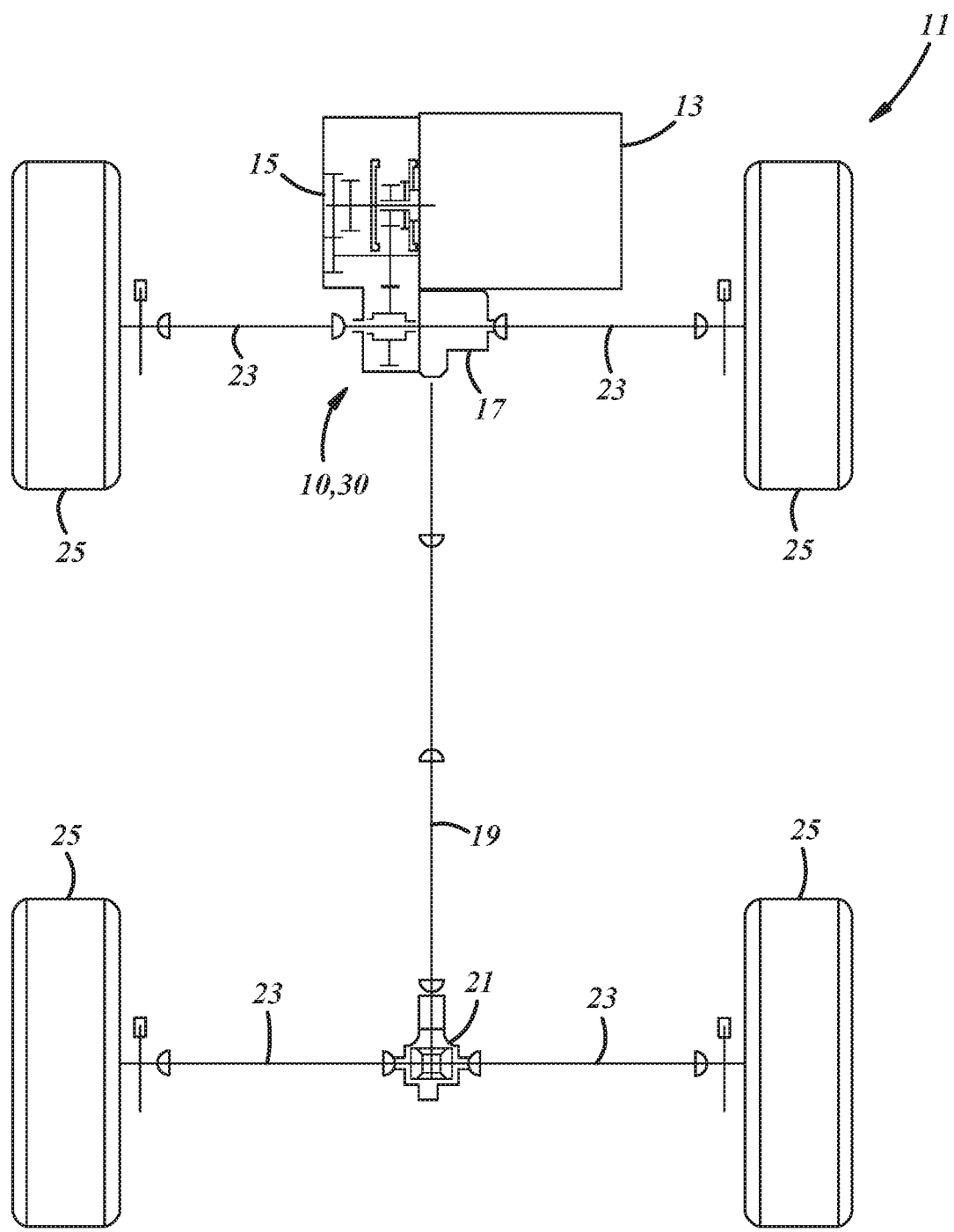
FIG. 1 is a schematic view of an embodiment of a vehicle driveline.

Referring in more detail to the drawings, a torque transmitting apparatus 10 can be equipped in an all-wheel drive (AWD), a front wheel drive (FWD), or a rear wheel drive (RWD) automotive driveline, to deliver torque from an engine to each of the driven wheels. FIG. 1 depicts one example of an AWD automotive driveline 11 that can be equipped with a torque transmitting apparatus 10 which is shown as a differential which may be in or associated or a Front Drive Unit (FDU) Power Transfer Unit (PTU). In other examples, the torque transmitting apparatus 10 could be installed in other regions of the driveline 11 such as the front axle or rear axle and could have different architectures and components than illustrated in the examples shown in the drawings. In the embodiment shown in FIG. 1, the driveline 11 includes an engine 13, a transmission 15, a PTU 17, a propshaft 19, a rear drive unit (RDU) 21, four sideshafts 23, and four wheels 25. Skilled artisans will generally appreciate how these components operate in use.

In the preferred embodiment, the torque transmitting apparatus 10 is a differential assembly 30 and can be used to split torque between left and right wheels and/or front and rear axles in an automotive driveline. In the embodiment shown in FIG. 2, the differential assembly 30 is an open differential and includes a first member or differential housing 32 having an interior 44 in which a first pinion gear 34, a second pinion gear 36, a first side gear 38, and a second side gear 40 are arranged. In general, the differential assembly 30 can have different designs and constructions depending upon, among other possible influences, the architecture of the AWD automotive driveline in general, upstream and downstream driveline components, packaging requirements, and torque output demands. For instance, the differential assembly 30 could have more than two pinion gears, and could have three or four or more pinion gears. The differential assembly 30 may include a second member or input gear such as a ring gear 42 coupled to the differential housing 32. In use, the ring gear is engaged by and driven for rotation by an upstream output gear, such as an output gear of a transmission 15 in a front axle layout or that of a pinion shaft connected to a propeller shaft in a rear axle layout. When driven, the housing 32 rotates about a central axis A.

The first and second pinion gears 34, 36 and first and second side gears 38, 40 are meshed together and interact with one another to carry out the differential's functions. Each of the gears 34, 36, 38, 40, has teeth formed around its exterior. The teeth of the first pinion gear 34 mesh with the teeth of the first and second side gears 38, 40, and similarly the teeth of the second pinion gear 36 mesh with the teeth of the first and second side gears 38, 40. The first and second pinion gears 34, 36 are mounted on a pinion shaft 46 that is received in a bore 48 in the housing. The pinion shaft has a center axis B oriented perpendicular to the central axis A of the differential housing 32. The first side gear 38 has a set of internal splines 49 for connection to a first sideshaft 23, an end of which is received in an opening 51 of the housing 32, and the second side gear 40 has a set of internal splines 53 for connection to a second sideshaft 23, an end of which is received in a generally oppositely facing opening 55 in the housing 32.

The differential housing 32 includes a main body 50 that may include a first boss 52 and a second boss 54 at axially opposed ends 57, 59 of the main body 50 (relative to axis A). The bosses 52, 54 may each have an inner surface that defines at least part of the openings 51 and 55, and an outer surface that defines a seat for bearings that support the differential assembly 30 in a main housing of a FDU, RDU, PTU or transaxle assembly.

Figure 3:
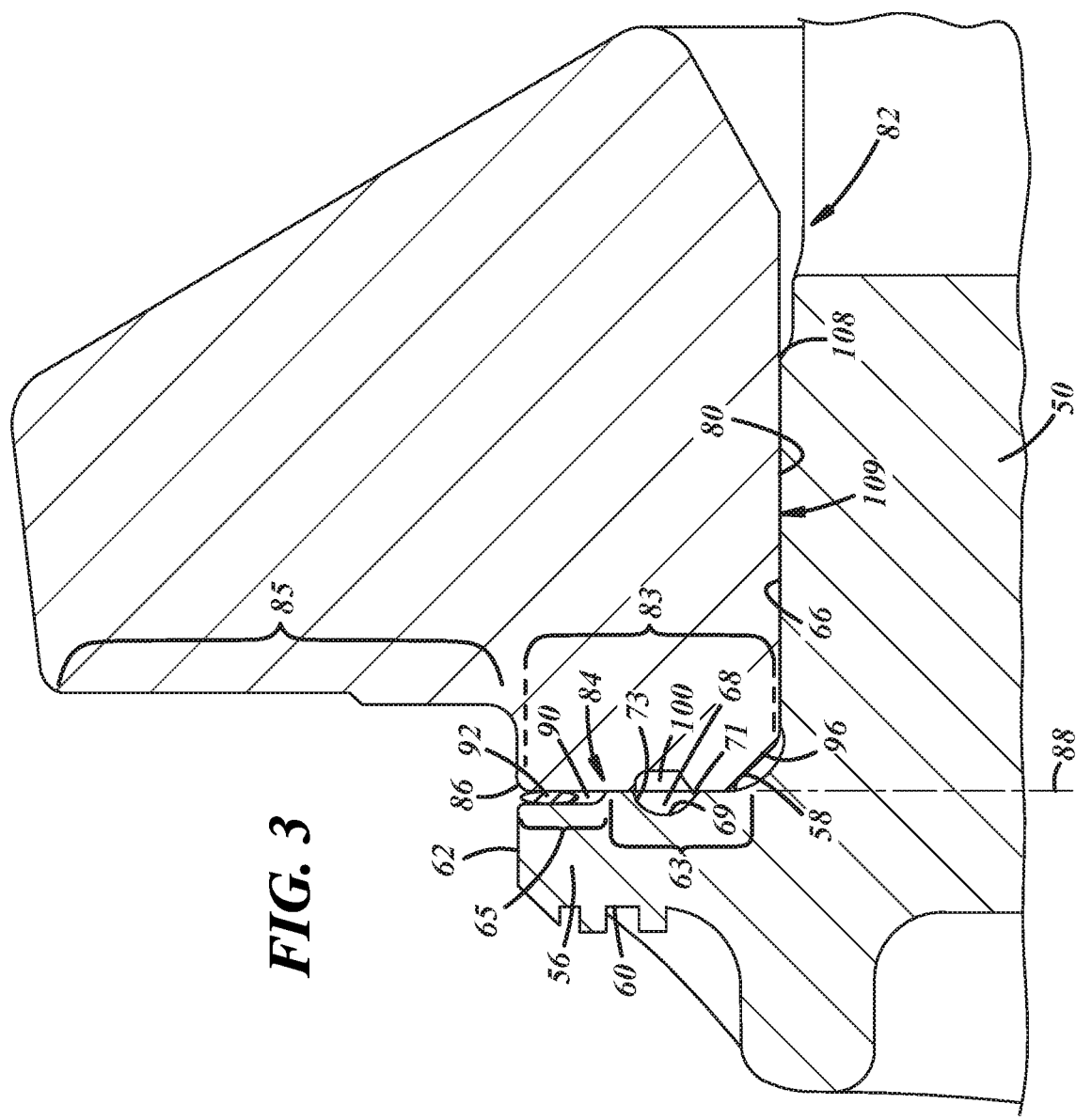
FIG. 3 is an enlarged, fragmentary sectional view of the encircled portion 3 in FIG. 2.

The differential housing 32 may include a flange 56 that extends radially outwardly from the main body 50 and which may be positioned between the ends 57, 59 of the differential housing 32. The flange 56 has a first surface 58 that extends generally radially and faces axially relative to the axis A of the differential housing 32, a second surface 60 that may extend generally radially and faces axially away from or opposite to the first surface 58 and a radially peripheral or radially outer surface 62 between the first and second surfaces 58, 60 and which defines a radially outer edge of the flange. As shown in FIG. 3, the first surface 58 may have a first portion 63 that extends radially relative to and is perpendicular to the axis A, and a second portion 65 that may be axially inclined (e.g. generally frustoconical) or axially offset (e.g. the first surface may be axially stepped) relative to the first portion. The second portion 65 may be located radially outboard of the first portion 63 (e.g. farther from the axis A) and the axial inclination or offset nature of the second portion may provide some clearance between the first surface 58 and an adjacent portion of the ring gear 42 in assembly, as shown in FIG. 3, to facilitate welding the ring gear 42 to the flange 56 as will be described in more detail later. In this way, the second portion 65 may be axially inclined or offset relative to the first portion 63 in a direction opposite to the axial direction that the first surface 58 faces.

Figure 2:
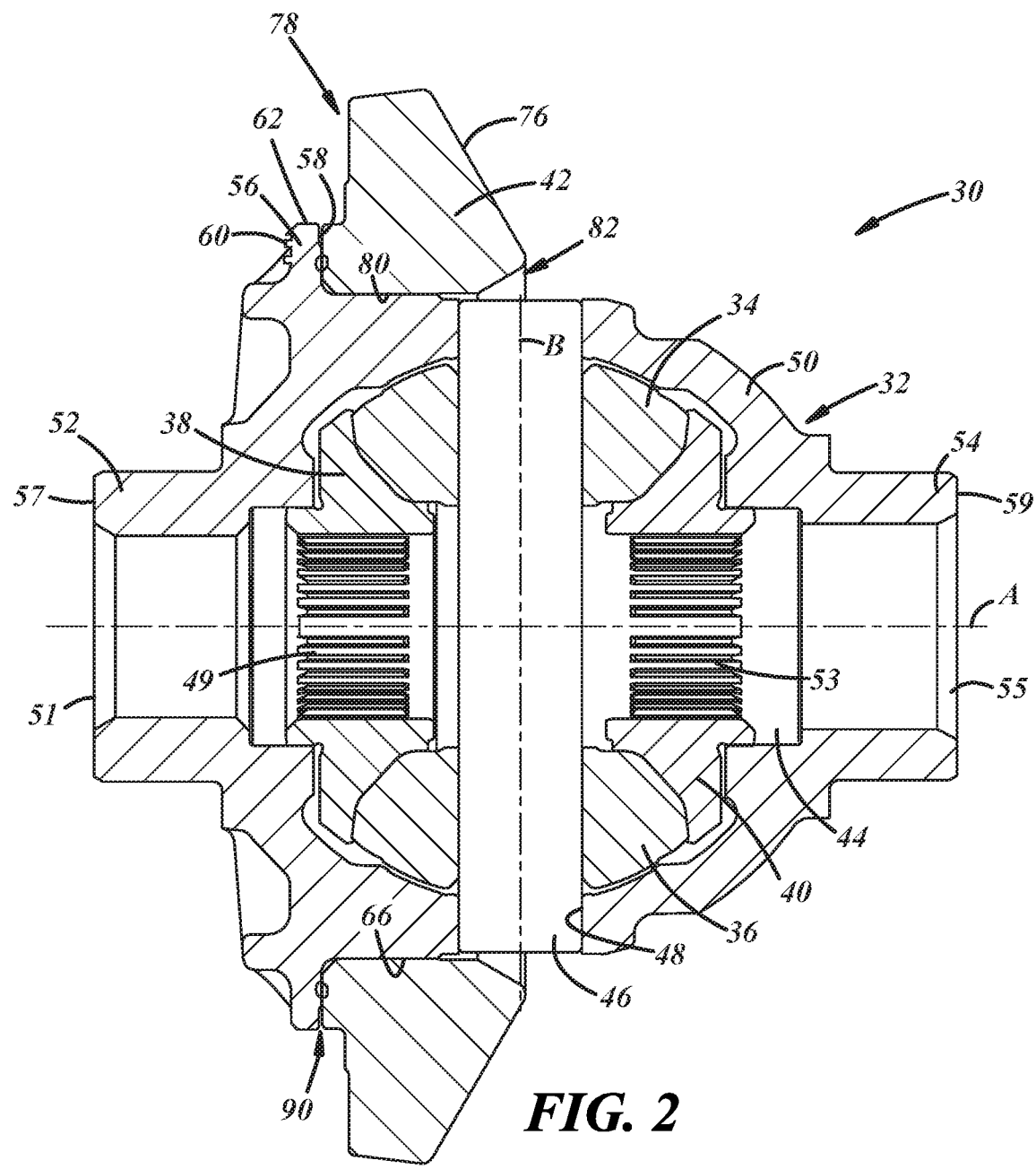
FIG. 2 is a sectional view of an embodiment of an automotive differential.

The main body 50 of the differential housing 32 may also include a pilot surface 66 that is adjacent to the flange 56 and extends axially away from the first surface 58 of the flange 56. The pilot surface 66 may define part of the exterior surface of the main body 50 and may have a diameter that is less than the diameter of the outer surface 62, and greater than the outer diameter of the bosses 52, 54. The ring gear 42 is received over the pilot surface 66 when the ring gear is assembled to the differential housing, as shown in FIGS. 2 and 3.

One or more channels or grooves 68 may be provided that extend along a portion of the first surface 58. The groove(s) 68 may extend axially into the flange 56 and have a depth measured axially between the first surface 58 and a base or bottom 69 of the groove, and a width between radially spaced inner and outer edges 71, 73 at the first surface. A top of the groove 68 is contiguous with the first surface 58 and is open, that is, not enclosed or defined by material of the flange 56. The depth and width of the groove(s) 68 may be constant or may vary along their lengths, as desired. The groove(s) 68 may have any desired cross-sectional shape such as a bevel, J-shaped, U-shaped, V-shaped, semi-circular, square (Dado), rectangular, or Dovetail. In the illustrated embodiment as shown in FIGS. 2-5, the groove(s) 68 is/are U-shaped.

The radial distance of each groove 68 from the axis A varies along the length of each groove from a location inboard of the outer surface 62 to an outlet 75 (FIG. 4) that intersects with, or is open to or communicates with the outer surface 62 of the flange 56. Along the first surface, one or more grooves 68 may be provided that collectively provide at least two outlets 75 that are circumferentially spaced apart by at least 30 degrees and communicate with the radial periphery of the flange 56. In at least some implementations, the groove(s) 68 extend generally circumferentially about the axis A along a path defined at least partially in the first surface 58 of the flange 56. One or more grooves 68 may be provided in the first surface 58 with two or more outlets 75 provided. A groove 68 may include two or more outlets 75, may be at least partially continuous between two or more outlets (e.g. as shown in FIG. 5, only the outer edge 73 of the groove intersects the outer surface 62 at one outlet, and the inner edge 71 is continuous in that area of the groove) or may be discontinuous (e.g. both inner and outer edges 71, 73 intersect the outer surface 62, such that the grooves 68 have distinct ends defined by the outlets).

Figure 4:
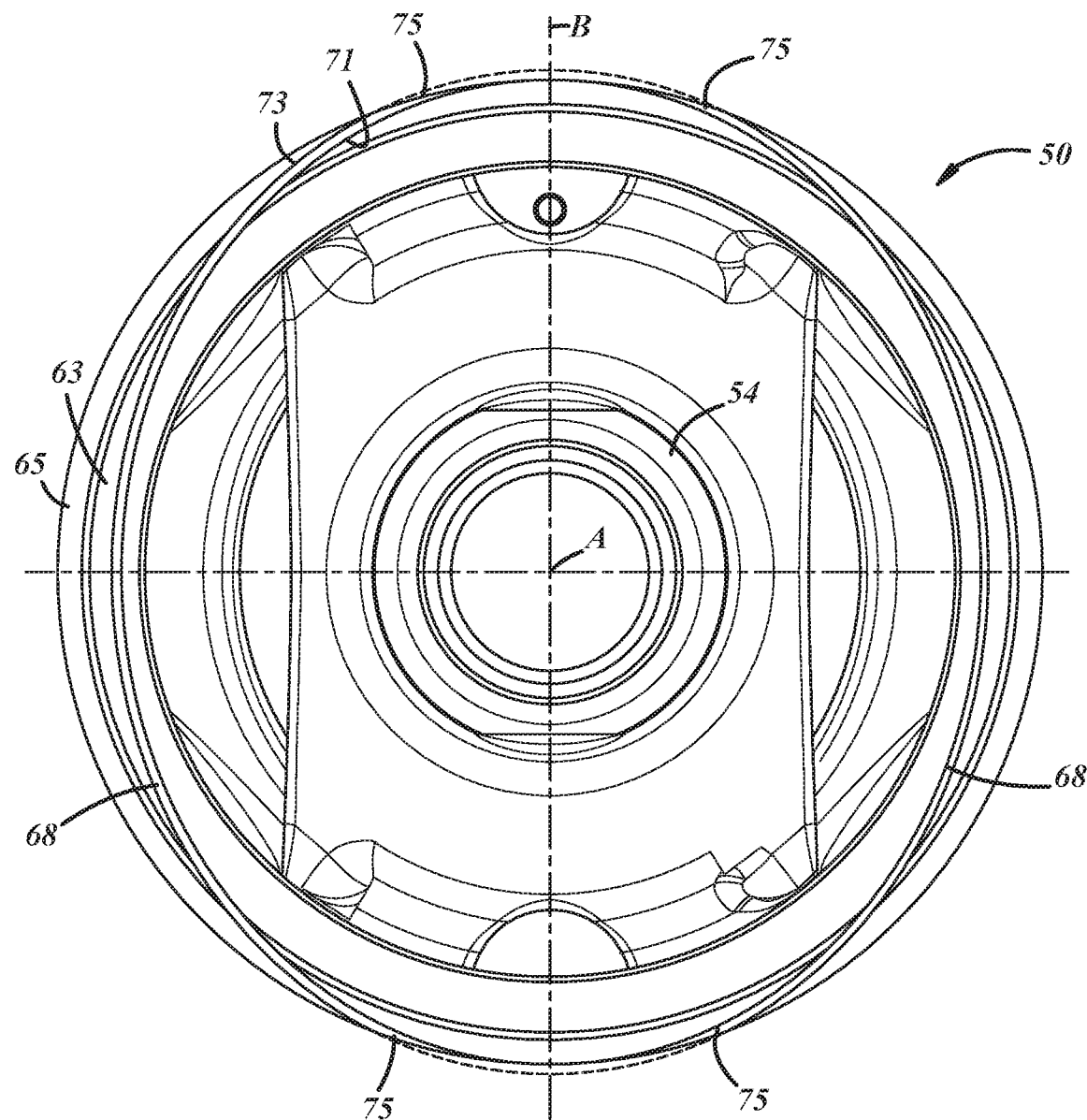
FIG. 4 is an end view of a first member of a torque transmitting apparatus depicting an elliptical groove path.
Figure 5:
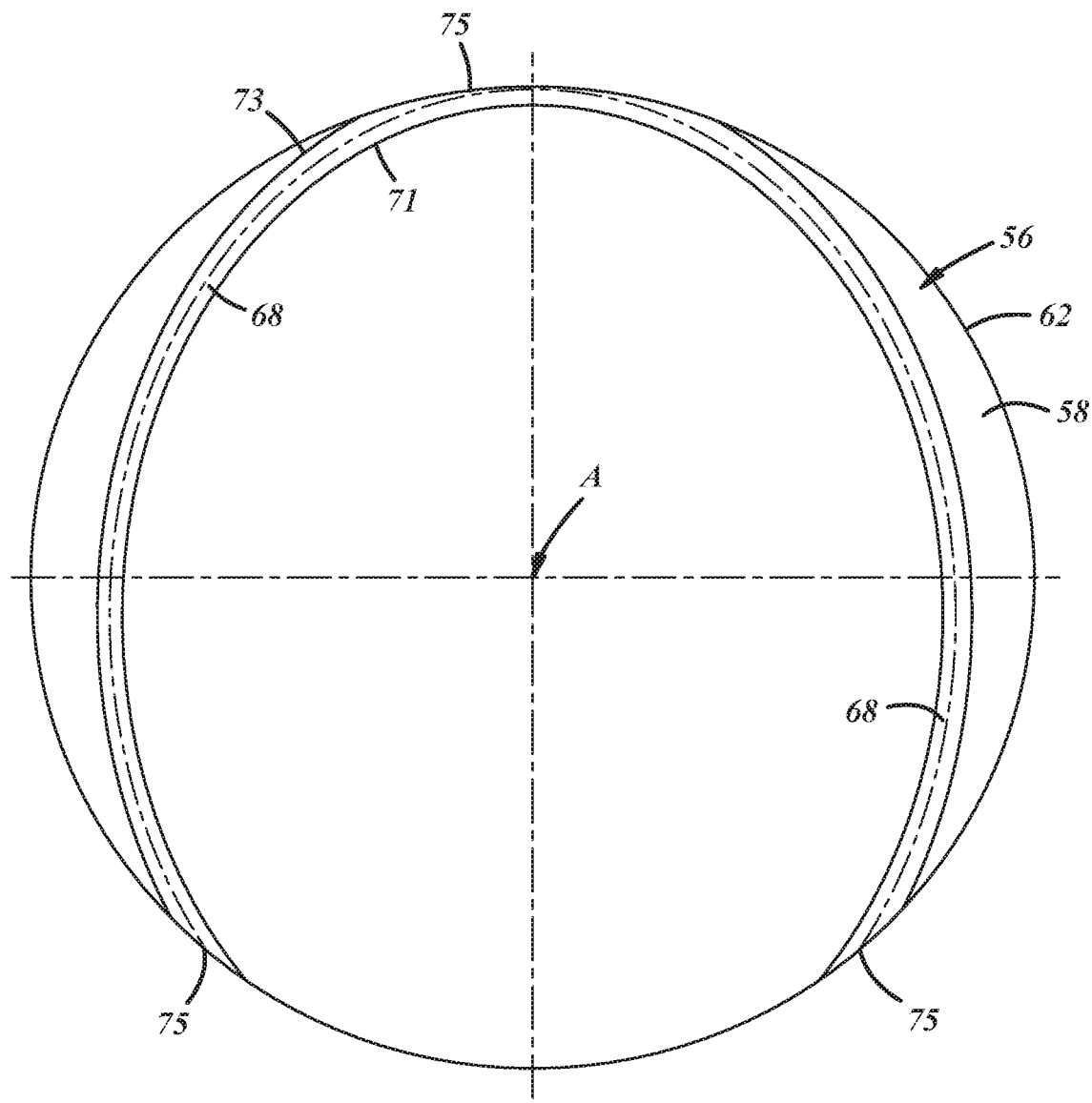
FIG. 5 is a simplified end view of a first member of a torque transmitting apparatus depicting an alternate construction of an elliptical groove path.

In the example shown in FIG. 4, two separate grooves 68 are provided in the first surface 58, and each groove intersects the outer surface 62 at each end, which provides four separate and circumferentially spaced apart outlets 75. The grooves 68 may each be defined by segments of a common oval, as generally shown by the imaginary, complementary oval segments shown in dashed lines and connecting the adjacent ends of the grooves 68 with each other. The oval as shown in FIG. 4 is concentric with the axis A, having a major diameter greater than the diameter of the outer surface 62, and a minor diameter less than the diameter of the outer surface 62, but the oval could be otherwise sized and arranged. For example, the groove shown in FIG. 5 is in the shape of an oval that is not coaxial with the flange. Further, the grooves 68 need not be of the same shape, size or extent. The grooves 68 may thus extend radially and circumferentially along the first portion or along both the first and second portions of the first surface.

As shown in FIG. 2, the ring gear 42 may be connected to the differential housing 32 so that the differential housing rotates with the ring gear to transmit torque received from an input of an upstream driveline component. The ring gear 42 may be annular and coaxially arranged with the differential housing. The ring gear may have an outer surface that includes a first surface 76 with outwardly extending teeth, a second surface 78 adjacent to and at least partially engaged with the first surface 58 of the flange 56, and an inner surface 80 coaxial with the axis A and defining a central opening 82. As shown in FIG. 3, in at least some implementations, the second surface 78 may include a first portion 83 that is radially overlapped by the first surface 58 of the flange 56. The area of radial overlap between the first surface 58 and second surface 78 may be called an interface region 84. The second surface 78 of the ring gear 42 may also have a second portion 85 that is inclined or axially offset from the first portion 83. This exposes and provides access from a radial direction to a radially outer portion or edge 86 of the interface region 84 to facilitate welding the ring gear 42 to the flange 56, as is set forth in more detail below. That is, the radially outer edge 86 of the interface region 84 may be open to the environment surrounding the differential housing 32.

In assembly, a portion of the differential housing 32 is received through the opening 82 of the ring gear 42, the inner surface 80 surrounds at least part of the pilot surface 66 and the second surface 78 of the ring gear is engaged with the first surface 58 of the flange 56. The ring gear 42 may be press-fit onto the differential housing 32 with metal-to-metal contact between the inner surface 80 of the ring gear 42 and the pilot surface 66 of the differential housing 32. As shown in FIG. 3, the ring gear 42 is welded to the flange 56 within the interface region 84, along or adjacent to the radially outer edge 86 of the interface region. One or both of the first surface 58 of the flange 56 and the second surface 78 of the ring gear 42 may be axially inclined relative to a plane 88 that is perpendicular to the axis A (e.g. as noted above with regard to the second portion 65 of the first surface 58 of the flange 56) to provide an axially and radially inwardly extending gap 90 (FIG. 2—shown without a weld bead in the gap) between the flange and ring gear at the radial outer edge 86 of the interface region 84 to facilitate welding these components together with a weld 92 (FIG. 3—shown with a weld bead 92 in the gap 90) that extends inwardly from the radial periphery a certain distance.

The weld 92 may be generated utilizing a welding process such as gas metal arc welding, plasma arc welding, friction welding, electromagnetic pulse welding, electron beam welding, laser beam welding, laser-hybrid welding, friction stir welding, resistance spot welding, or a similar welding process. In at least some implementations, the welding process used is laser beam welding. Once the ring gear 42 is radially positioned (i.e. pressed) onto the pilot surface 66 of the differential housing 32 and the first surface 58 of the flange 56 and the second surface 78 of the ring gear 42 are abutted together, the weld 92 can be generated circumferentially around the periphery of the interface region 84 between the flange 56 and the ring gear 42, for example, at the radially outer edge 86 of the radially overlapped portions of the first surface 58 of the flange and the second surface 78 of the ring gear.

In at least some implementations, some volume of gas may reside between the ring gear 42 and differential housing 32. One example of an area in which gas may reside is in the region of a bevel or radius 96 at the leading edge of the opening 82 in the ring gear 42, where the leading edge is adjacent to the flange 56 and the bevel or radius 96 is provided to facilitate assembly of the ring gear onto the housing. With the close fit or interference/press-fit between the ring gear 42 and pilot surface 66 of the differential housing 32, gasses cannot readily vent between the inner surface 80 of the ring gear and the pilot surface 66. Hence, venting of gasses must otherwise occur between the adjacent surfaces 58, 78 of the flange 56 and ring gear 42.

To facilitate venting gasses that may otherwise be trapped radially inwardly of the weld 92 as the weld between the flange 56 and ring gear 42 is formed, one or more grooves 68 have a portion located radially inboard of the weld 92 and extend to a portion (e.g. an outlet) that is outboard or, provided in or communicates radially outboard of the weld (or weld region) and permit radial venting of gasses from the seam or interface between the ring gear and flange. Hence, gasses may flow in a groove 68 from radially inboard the weld 92 to radially outboard of the weld before the weld is completed in that area of the flange 56. When the weld 92 is completed in the area of a groove 68, a portion of the groove (which may include the outlet 75) may be filled in and closed off by the weld such that further venting through that groove is prevented. If a groove ends at the gap 90 rather than at the outer edge 86 of the interface region 84 (i.e. the outlet 75 is open to the gap 90 but the groove 68 does not extend all the way to the outer surface 62 of the flange 56), the weld may simply close off the gap 90 so that the groove no longer communicates with the outer edge 86. In this example, if the weld 92 does not completely fill the gap 90, venting may continue from one or more grooves to and through the gap 90 until the gap is fully closed by the weld. With multiple outlets 75 provided by one or more grooves 68, however, gas may vent through other outlets and the volume of gasses between the flange 56 and ring gear 42 can be reduced until the last outlet is closed off as the weld 92 is formed circumferentially around the flange/ring gear interface. In this way, the volume of gas finally trapped by the weld 92 is reduced, and the trapped gasses may occupy a comparatively greater volume of open space between the ring gear 42 and flange 56 (e.g. regions that would otherwise be occupied by additional trapped gas, and areas that include the portions of the grooves inboard of the weld), such that the volume and pressure of the trapped gas are less than they would be without the grooves. In this way, the pressure of trapped gas can be maintained below a level at which the gas would blow through or physically affect the weld.

Further, the venting is achieved with a relatively easy to form groove or grooves 68 provided in a surface 58 of the flange 56 and not with an axially extending drilled hole. Prior attempts at solving the problem associated with trapped gas inboard of the weld region including drilling ventilation holes axially through the flange and spaced from the periphery of the flange so that gas could escape axially through the holes in the flange. Drilling one or more axially extending holes though the flange can add complexity to the manufacturing process in terms of material flow, set up and operation, and thereby increase manufacturing time and component cost. Additionally, the axial holes remain open to the environment after the welding process and thus, may allow the ingress into the holes of contaminants like dirt and liquid mediums such as solvents or debris, which may be used during post assembly, post assembly testing, or in vehicle use. In the implementations noted above, the radially oriented outlets 75 defined by the grooves 68 in the surface 58 of the flange 56 are closed off from the exterior environment when the weld is completed such that no opening remains into which fluids or contaminants may enter or gather. That is, a weld 92 that is circumferentially continuous may close each outlet 75 from communication with the exterior environment.

Figure 6:
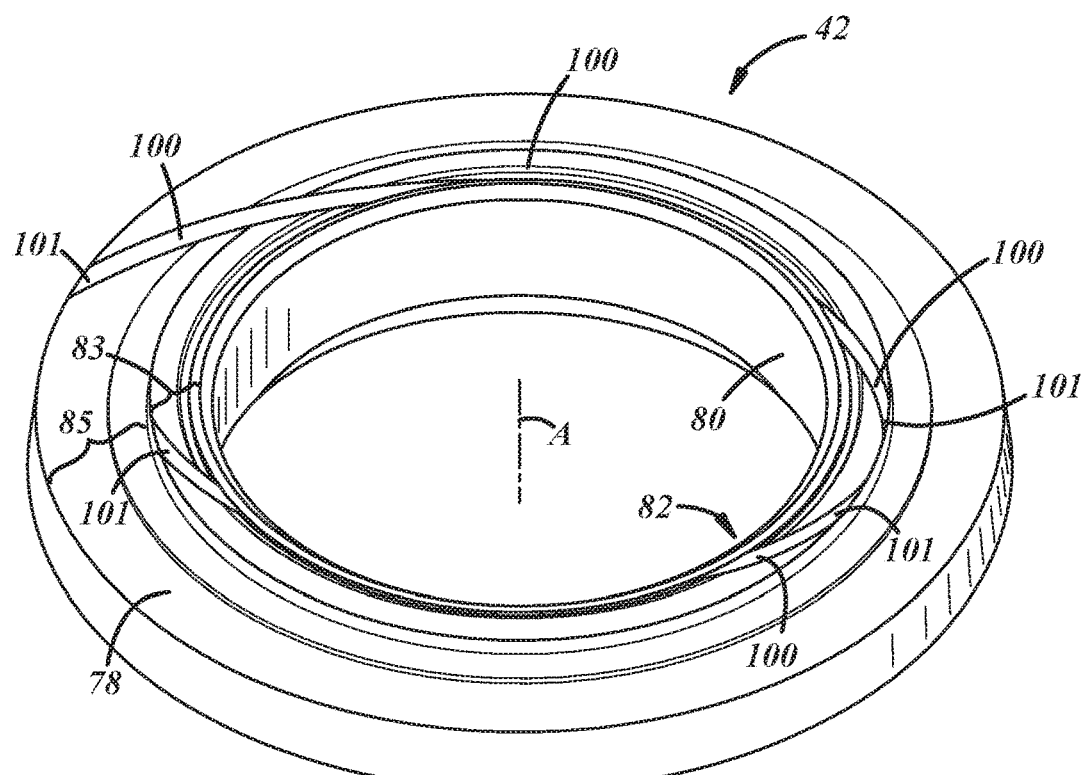
FIG. 6 is a perspective view of an automotive ring gear.

As shown in FIGS. 3 and 6, in addition to or instead of the grooves 68 formed in the first surface 58 of the flange 56, the ring gear 42 may also include one or more channels or grooves 100 extending axially into the second surface 78 in the interface region 84 between the second surface and the flange. The groove or grooves 100 in the ring gear 42 may be formed in the same manner and have the same physical characteristics as the groove or grooves 68 described above with regard to the flange 56. For example, the grooves 100 may extend to an outlet 101 which may be communicated with the outer edge 86 of the interface region 84 directly (e.g. the outlet 101 may intersect the outer edge 86) or via a gap between the adjacent surfaces 58, 78 of the flange 56 and ring gear 42 (e.g. gap 90). Because the grooves 100 in the ring gear may be formed like the grooves 68 in the flange 42, a detailed recitation of the grooves 100 in the ring gear will be omitted. When a groove or grooves 68, 100 are provided in both the flange 56 and the ring gear 42, the grooves may overlap and communicate with each other, the grooves may be separate and independent, or both situations may occur in and among one or more grooves in each component.

Figure 7:
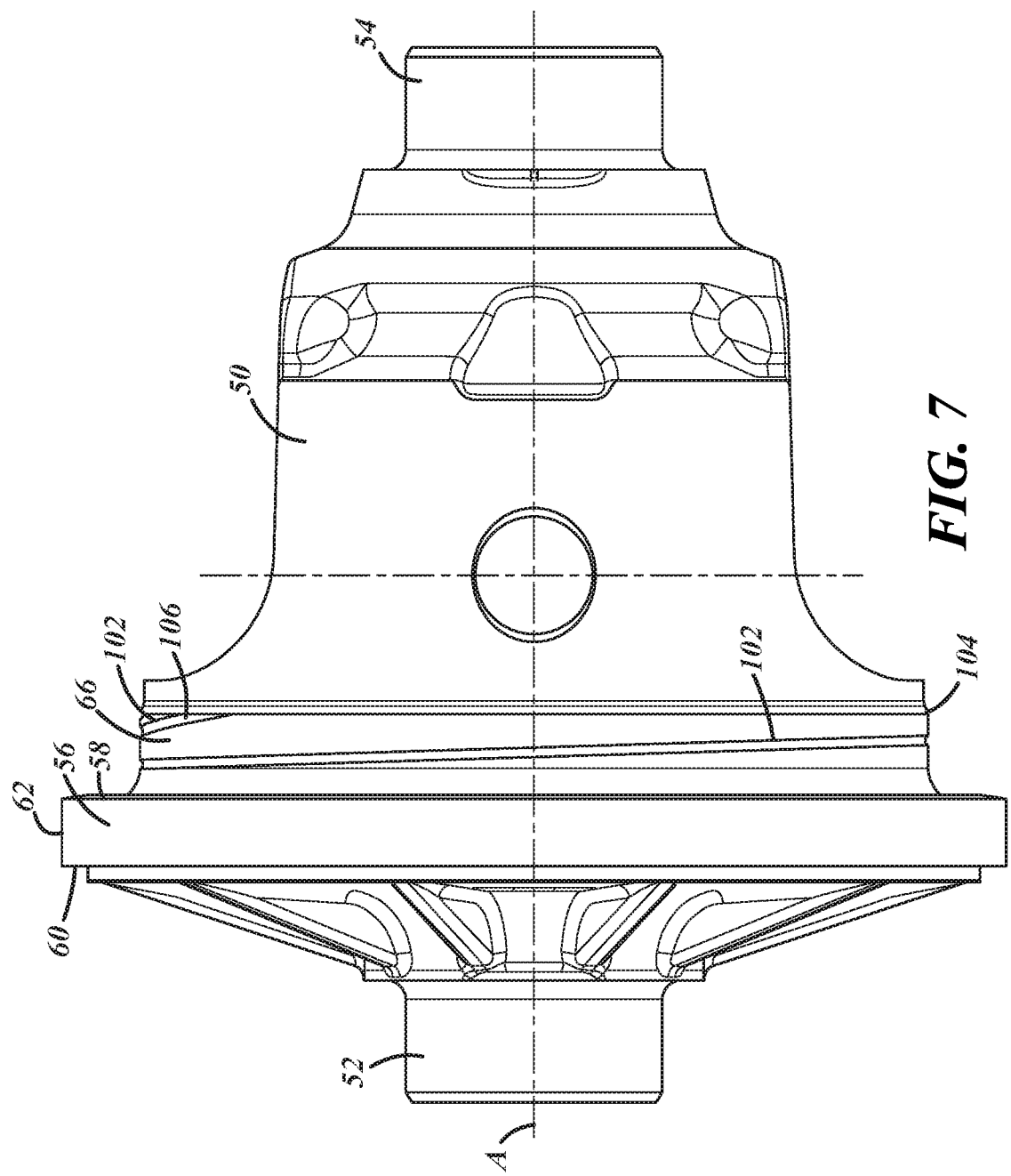
FIG. 7 is a side view of an automotive differential housing depicting a helical groove.

In addition to or instead of the groove(s) 68, 100 in one or both of the flange 56 and ring gear 42, as shown in FIG. 7, one or more grooves 102 may be included in the pilot surface 66 of the differential housing 32. The groove 102 may start at the pilot surface 66 and extend radially into the housing 32 a certain depth to a base of the groove. The groove(s) 102 may extend axially from a location axially inboard of an outer edge 104 of the pilot surface to an outlet 106 that communicates axially with an axially outer edge 108 (shown in FIG. 3) of the axial interface region 109 between the ring gear 42 and differential housing 32. The axially outer edge 108 is axially opposite to the edge of the ring gear 42 that is adjacent to the flange 56. The groove 102 may extend the full axial length of the pilot surface 66, or the full length of the axial interface region 109, which is the extent of axial overlap between the ring gear 42 and the pilot surface. The groove or grooves 102 may extend circumferentially as well as axially. In at least some implementations, as shown in FIG. 7, a groove 102 may be spiraled or generally helical and extend continuously from one end to the outlet 106. The spiral or helix of the groove may have a pitch that results in one or more circumferential laps around the pilot surface 66 (e.g. may circumferentially span 360 or more degrees). And more than one outlet 106 may be provided, with the outlets being circumferentially spaced apart from each other and arranged in communication with the axially outer edge or portion of the axial interface between the gear 42 and housing 32.

Figure 8:
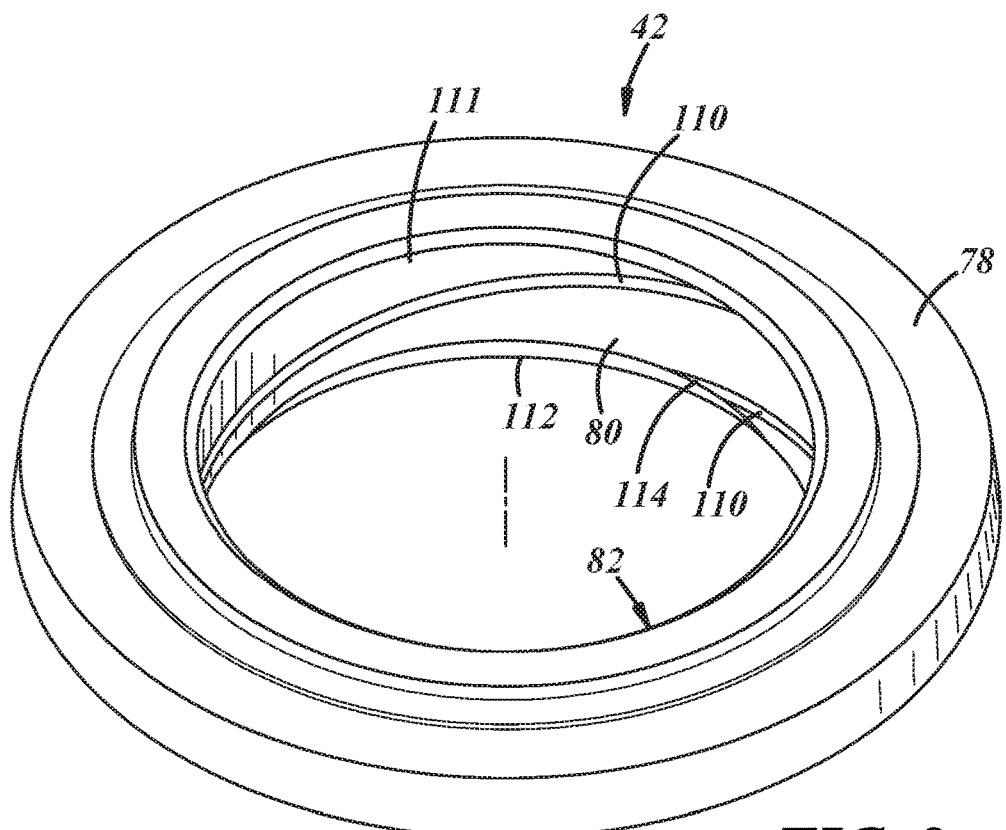
FIG. 8 is a perspective view of an automotive ring gear having an alternative construction.

In addition to or instead of the grooves 68, 100, 102 noted above, as shown in FIG. 8, one or more grooves 110 may also be included on the inner surface 80 of the ring gear 42. The groove 110 would extend radially outwardly, into the ring gear 42 from the inner surface 80 and may be located, arranged and constructed as set forth with regard to the groove 102 in the pilot surface 66. The groove 110 may extend from one axial side 111 of the inner surface 80 adjacent to the second surface 78 or opening 82, to the other axial side 112 at an outlet 114.

The groove or grooves 68, 100, 102, 110 when provided in one or both of the overlapped surfaces of two components 32, 42 to be joined by the weld process, may result in multiple, circumferentially spaced apart outlets 75, 101, 106, 114. These radially oriented outlets will be closed, usually one at a time, by the welding process as the weld 92 is continually formed around the circumference of an interface region between the components. Having a plurality of outlets eliminates the need to orient a single outlet such that it remains open until the weld is complete or mostly complete. Even with multiple outlets located at an interface being welded, it is likely that the last to be closed outlet will be closed prior to the weld joint being fully completed. If this is the case, the majority of the expanded gas will have already vented before the final outlet is closed, and the remaining trapped gas would have no effect on the weld integrity. This joining method has the added benefit of sealing off the remaining cavity from liquid mediums which may be used during post-weld processing and in vehicle use.

As set forth above, to vent gas out of areas between the ring gear and the housing 32, the grooves 68 have a portion located radially inboard of the weld 92 and at least one outlet that, at least without the weld, is communicated with the radially outer edge of the interface region 84 and/or with space or area radially outboard of the interface region 84. The outlets 75 may open directly into that space or area, or the outlets may communicate with a gap between the surfaces 58, 78 of the flange 56 and ring gear 42, where that gap is open to that space or area outboard of the interface region 84. As used herein, the term outlet is intended to refer to a portion of the groove that communicates with an area outboard of an interface region between first and second surfaces of first and second members.

While at least a portion of the first surface 58 of the flange 56 and the second surface 78 of the ring gear are described as being radially oriented, these surfaces might be at some other angle to the axis A, and may be parallel and abutted together along some portion of each surface in assembly. In at least some implementations, the surfaces 58, 78 are perpendicular or substantially perpendicular to the axis A, where substantially perpendicular includes perpendicular and a range of 10 degrees from perpendicular. In at least some implementations, the second surface 78 abuts the first surface 58 of the flange outboard of or at the edges 71, 73 of the grooves 68, along at least a portion of the grooves, to enclose the groove between the opposed surfaces 58, 78 so that the outlets 75 are open (at least prior to the weld 92 being formed) but the remainder of the groove is enclosed.

Figure 9:
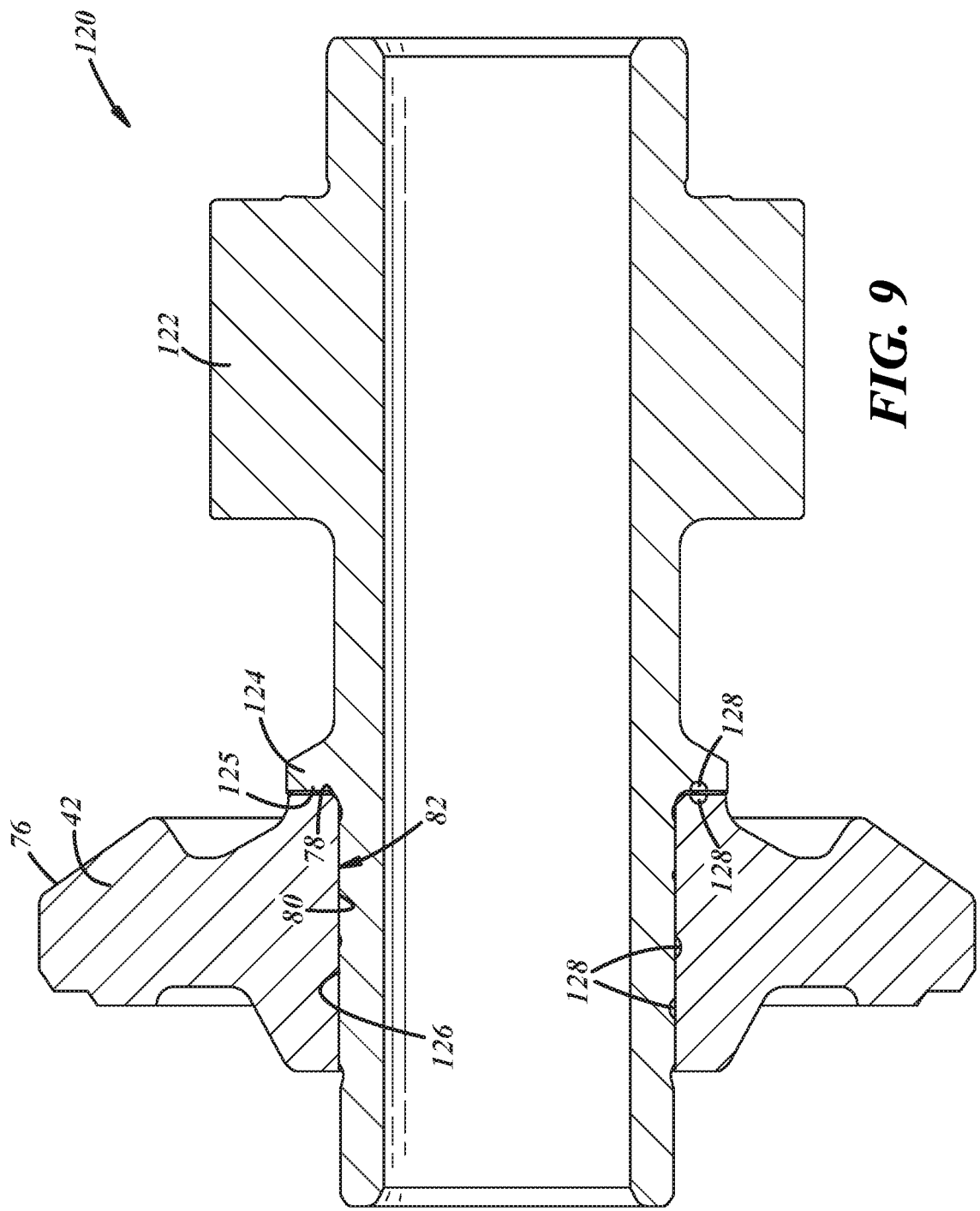
FIG. 9 is a sectional view of a gear coupled to a shaft of a torque transmitting apparatus.

FIG. 9 shows an embodiment wherein the torque transmitting apparatus 10 is a Power Transfer Unit (PTU) 120. The PTU 120 can be used to transmit the torque from a lateral direction to a transverse direction and between the transaxle to the rear axle in an AWD automotive driveline. As shown in FIG. 9, a first member of the PTU 120 may be a gear, such as a ring gear 42, may be coupled to a second member which may be an input shaft 122 of the PTU so that the gear and input shaft rotate together. The ring gear 42 may be the same as or similar to the ring gear described above and the same reference numbers are used and the ring gear will not be fully described again. Further, with regard to surfaces against which the ring gear 42 is mounted, the input shaft 122 may have features similar to the differential housing 32 such that a full description of the input shaft 122 is also not needed.

The input shaft 122 may include a flange 124 having a radially outwardly extending first surface 125 that radially overlaps and may be engaged by the second surface 78 of the ring gear 42. The input shaft 122 may also have an axially extending pilot surface 126 that is received within the opening 82 of the ring gear as set forth above with regard to pilot surface 66. A groove or grooves 128 may be formed in one or more of the overlapped radially extending surfaces 78, 125 and the overlapped axially extending surfaces 66, 80 of the gear 42 and input shaft 122. The groove or grooves 128 may be formed similar to the grooves 68, 100, 102, 110 set forth above with regard to the ring gear 42 and differential housing 32, and as such, the grooves 128 need not be further described.

Figure 10:
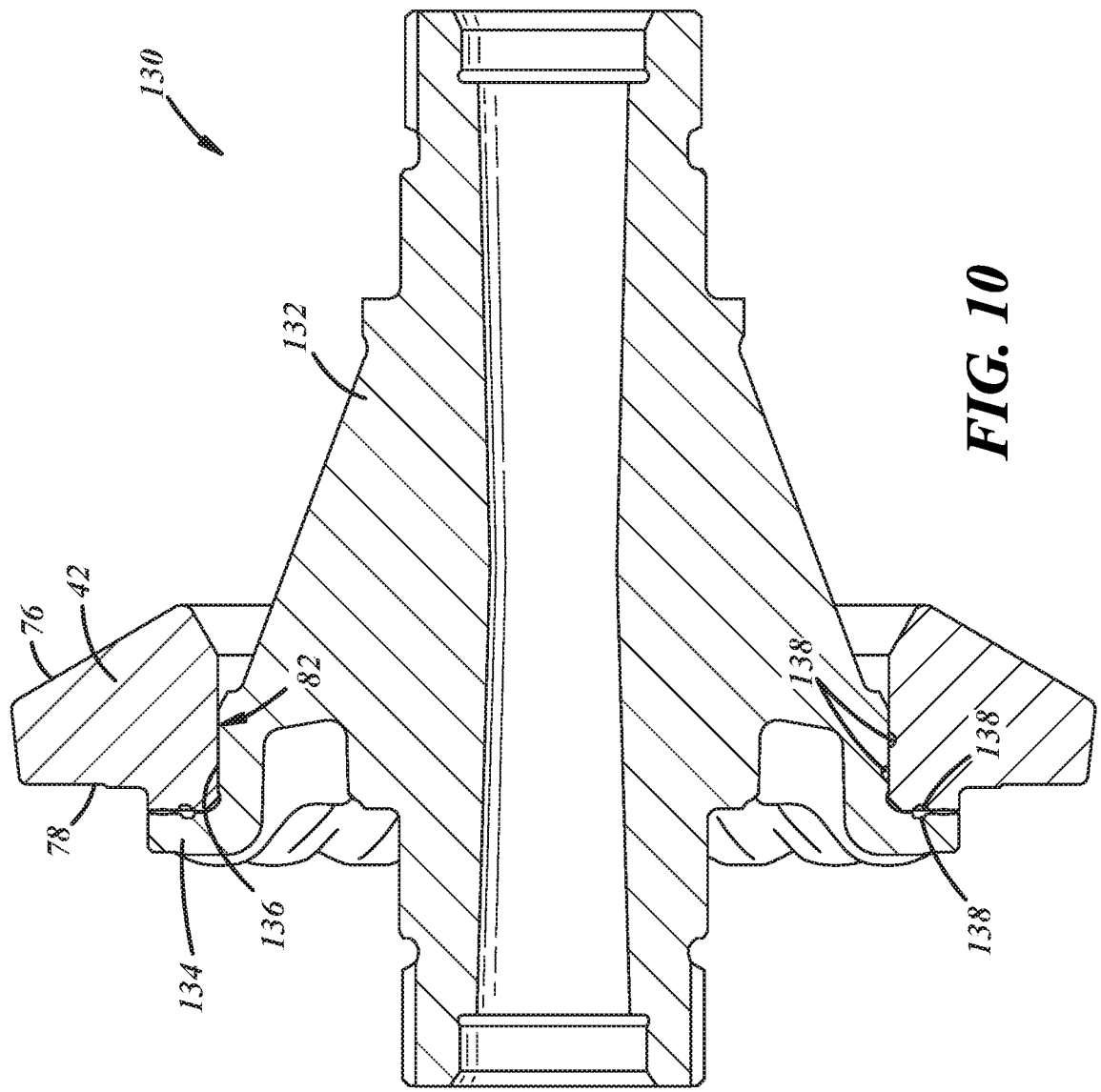
FIG. 10 is a sectional view of a gear coupled to a housing of a torque transmitting apparatus.

FIG. 10 shows an embodiment wherein the torque transmitting apparatus 10 is a Rear Drive Unit 130. The RDU 130 can be used to transmit the torque from a transverse direction to a lateral direction between the PTU and the wheels in an AWD automotive driveline. As shown in FIG. 10, a first member of the RDU 130 may be a gear, such as a ring gear 42, may be coupled to a second member which may be a spool shaft 132 of the RDU so that the gear and spool shaft rotate together. The ring gear 42 may be the same as or similar to the ring gear described above and the same reference numbers are used and the ring gear will not be fully described again. Further, with regard to surfaces against which the ring gear 42 is mounted, the spool shaft 132 may have features similar to the differential housing 32 such that a full description of the spool shaft 132 is also not needed.

The spool shaft 132 may include a flange 134 that radially overlaps and may be engaged by the second surface 78 of the ring gear 42. The spool shaft 132 may also have an axially extending pilot surface 136 that is received within the opening 82 of the ring gear as set forth above with regard to pilot surface 66. A groove or grooves 138 may be formed in one or more of the overlapped radially extending surfaces 78, 136 and the overlapped axially extending surfaces 66, 80 of the gear 42 and spool shaft. The groove or grooves 138 may be formed similar to the grooves 68, 100, 102, 110, 128 set forth above with regard to the ring gear 42 and differential housing 32 and as such, the grooves 138 need not be further described.

Accordingly, a first member and a second member may be coupled together for rotation. The first and second members may have overlapped surfaces that are in contact along at least part of one or more interface regions between the components. In at least some implementations, the torque transmitting apparatus may be a differential assembly, an input shaft assembly or a spool shaft assembly. The first member may be a differential housing, an input shaft, a spool shaft or a ring gear. Similarly, the second member may be a differential housing, an input shaft, a spool shaft or a ring gear. That is the terms first member and second member can be used interchangeably between the components of the torque transmitting apparatus, where the first member and second member are connected together for co-rotation.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. In the preceding description, various operating parameters and components are described for one or more exemplary embodiments. These specific parameters and components are included as examples and are not meant to be limiting.

Reference in the preceding description to "one example," "an example," "one embodiment," "an embodiment", "an implementation" or "at least some implementations" means that a particular feature, structure, or characteristic described in connection with the example is included in at least one example or implementation including one or more but not necessarily all innovative features or components. References to various examples, embodiments or implementations do not necessarily refer to the same example, embodiment or implementation each time it appears.

The invention claimed is:

1. A torque transmitting apparatus, comprising:
a first member arranged for rotation about an axis and having a first surface oriented substantially perpendicular to the axis; and
a second member having a second surface with at least a portion that is parallel to and engaged with at least a portion of the first surface, and the second member is coupled to the first member by a weld provided at an interface region defined by an area of radial overlap between the first surface and the second surface, and wherein a groove is provided in one or both of the first surface and the second surface, the groove has a portion located radially inboard of the weld and at least one outlet that, at least without the weld, is communicated with a radially outer edge of the interface region.

2. The apparatus of claim 1 wherein the at least one outlet is covered by the weld or is radially outboard of the weld.

3. The apparatus of claim 1 wherein the at least one outlet intersects the radially outer edge of the interface region.

4. The apparatus of claim 1 wherein the first surface includes a first portion that is axially inclined away from a second portion providing a gap between the second surface and the first portion of the first surface, the gap communicates with the radially outer edge of the interface region and wherein at least one of the at least one outlet communicates with the radially outer edge of the interface region via the gap.

5. The apparatus of claim 1 wherein the groove is formed in the first surface, and the first member includes a radially outer surface at a radially outer edge of the first surface and the at least one outlet is open to the radially outer surface at the radially outer edge of the first surface.

6. The apparatus of claim 1 wherein the groove provides multiple outlets.

7. The apparatus of claim 1 wherein multiple grooves are provided and the grooves collectively include multiple outlets that are spaced apart circumferentially.

8. The apparatus of claim 1 wherein the groove extends circumferentially relative to the axis and includes two outlets with one outlet at each end of the groove.

9. The apparatus of claim 1 wherein the groove is formed in the first surface and has a depth measured axially from the first surface to a bottom of the groove, and a width between first and second sides of the groove, wherein the groove is open to the first surface axially opposite to the bottom, and wherein the second surface engages the first surface outboard of both the first and second sides of the groove.

10. The apparatus of claim 1 wherein the outlet is defined in one or both of the first surface and second surface.

11. The apparatus of claim 1 wherein the outlet is radially aligned with the portion of the groove located radially inboard of the weld.

12. A torque transmitting apparatus, comprising:
a first member arranged for rotation about an axis and having a radially outwardly extending flange that defines a first surface that extends radially outwardly to a radially outer edge of the flange, and the first member has a pilot surface that extends axially along at least of an outer surface of the first member; and
a second member having a second surface that extends radially outwardly, at least part of the second surface is parallel to and engaged with at least a portion of the first surface, the second member includes an inner surface that defines an opening through which the first member extends with the inner surface engaged with the pilot surface, and the second member is coupled to the first member by a weld provided in an interface region defined by an area of radial overlap between the first surface and the second surface, wherein a groove is provided in one or both of the first surface and the second surface, the groove has a portion located radially inboard of the weld and at least one outlet that, at least without the weld, is communicated with a space radially outboard of the interface region and wherein the outlet is defined in one or both of the first surface and second surface.

13. The apparatus of claim 12 wherein the weld fills at least part of the groove and prevents communication from the portion located radially inboard of the weld to the outlet.

14. The apparatus of claim 12 wherein the first member is one of a shaft or a housing and the second member is a gear.

15. The apparatus of claim 12 wherein the at least one outlet is covered by the weld or is radially outboard of the weld.

16. The apparatus of claim 12 wherein the at least one outlet is open to a radially outer edge of the interface region.

17. The apparatus of claim 12 wherein the first surface includes a first portion that is axially inclined away from a second portion providing a gap between the second surface and the first portion of the first surface, the gap communicates with a radially outer edge of the interface region and wherein the outlet communicates with the radially outer edge of the interface region via the gap.

18. The apparatus of claim 12 wherein the groove provides multiple circumferentially spaced apart outlets.

19. The apparatus of claim 12 wherein multiple grooves are provided and the grooves collectively include multiple outlets that are spaced apart circumferentially.

20. The apparatus of claim 12 wherein the groove extends circumferentially relative to the axis and includes two outlets with one outlet at each end of the groove.

* * * * *